United States Patent
Raghavanpillai et al.

(10) Patent No.: US 9,777,170 B2
(45) Date of Patent: Oct. 3, 2017

(54) FLUORINATED POLYMER ADDITIVES DERIVED USING HYDROPHILIC CHAIN TRANSFER AGENTS FOR ARCHITECTURAL COATINGS

(71) Applicant: THE CHEMOURS COMPANY TT, LLC, Harrisburg, PA (US)

(72) Inventors: Anilkumar Raghavanpillai, Wilmington, DE (US); Timothy Pellenbarg, Wilmington, DE (US); Hau-Nan Lee, Wilmington, DE (US); James J. Hughes, Wilmington, DE (US); Kai Qi, Wilmington, DE (US); John Russell Crompton, Jr., Bear, DE (US); Brad M Rosen, Philadelphia, PA (US)

(73) Assignee: THE CHEMOURS COMPANY TT, LLC, Harrisburg, PA (US)

( * ) Notice: Subject to any disclaimer, the term of this patent is extended or adjusted under 35 U.S.C. 154(b) by 301 days.

(21) Appl. No.: 14/628,729

(22) Filed: Feb. 23, 2015

(65) Prior Publication Data
US 2015/0240090 A1 Aug. 27, 2015

Related U.S. Application Data

(60) Provisional application No. 61/944,092, filed on Feb. 25, 2014.

(51) Int. Cl.
| | |
|---|---|
| C08K 3/20 | (2006.01) |
| C08G 18/08 | (2006.01) |
| C08G 75/02 | (2016.01) |
| C08L 27/12 | (2006.01) |
| C09D 7/12 | (2006.01) |
| C09D 5/00 | (2006.01) |
| C08F 2/38 | (2006.01) |

(52) U.S. Cl.
CPC ............ C09D 7/125 (2013.01); C08F 2/38 (2013.01); C09D 5/00 (2013.01)

(58) Field of Classification Search
CPC ... C09D 7/125; C09D 5/00; C08F 2/38; C08F 220/24; C08F 220/34; C08F 220/06; C08F 2220/306
USPC .......................... 523/411; 524/507, 520, 544
See application file for complete search history.

(56) References Cited

U.S. PATENT DOCUMENTS

| | | | |
|---|---|---|---|
| 4,127,711 A | 11/1978 | Lore et al. | |
| 5,344,903 A | 9/1994 | Raiford et al. | |
| 5,721,321 A | 2/1998 | Fock et al. | |
| 5,977,256 A | 11/1999 | Huybrechts et al. | |
| 7,638,575 B2 | 12/2009 | Yamamoto et al. | |
| 8,071,489 B2 | 12/2011 | Huang et al. | |
| 2002/0042470 A1 | 4/2002 | Moore et al. | |
| 2003/0236340 A1 | 12/2003 | Kubicek et al. | |
| 2004/0186254 A1* | 9/2004 | Fan | C04B 41/4842 526/243 |
| 2005/0113508 A1 | 5/2005 | Jariwala et al. | |
| 2006/0149012 A1 | 7/2006 | Terrazas et al. | |
| 2010/0044050 A1* | 2/2010 | Savu | B01F 17/0035 166/308.6 |
| 2010/0179262 A1 | 7/2010 | Dams et al. | |

FOREIGN PATENT DOCUMENTS

| | | |
|---|---|---|
| CN | 102617783 A1 | 8/2012 |
| CN | 102627721 A1 | 8/2012 |
| GB | 2432836 A1 | 6/2007 |
| JP | 1995228618 A | 8/1995 |
| JP | 2004115691 A | 4/2004 |
| JP | 2005029743 A | 2/2005 |
| JP | 201000766 A | 5/2010 |
| JP | 2012184400 A | 9/2012 |

OTHER PUBLICATIONS

Honda, et al., in Macromolecules, 2005, 38, 5699-5705.

* cited by examiner

*Primary Examiner* — William Cheung

(57) ABSTRACT

The present invention comprises a composition and method of use for providing cleanability to paint comprising an aqueous emulsion of Formula (I)

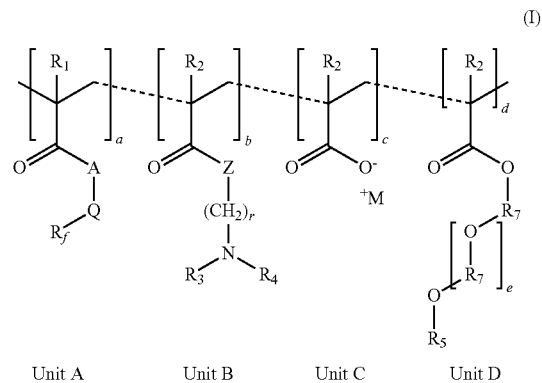

Unit A   Unit B   Unit C   Unit D wherein the composition of Formula (I) is a random copolymer; wherein said composition of formula (I) further comprises residue from a hydrophilic chain transfer agent. The compositions of the present invention provide durability to coating compositions, while also providing surface effects such as increased water and oil contact angles, enhanced dirt pickup resistance, and enhanced cleanability to the coating films. For these reasons, the composition of the present invention is particularly suitable for use as additives to exterior coatings and paints.

22 Claims, No Drawings

FLUORINATED POLYMER ADDITIVES DERIVED USING HYDROPHILIC CHAIN TRANSFER AGENTS FOR ARCHITECTURAL COATINGS

FIELD OF THE INVENTION

This invention relates to a composition comprising a fluoropolymer with hydrophilic chain transfer agent residue and its use as an additive to architectural coating compositions such as water-based latex paints, to provide durable surface effects.

BACKGROUND OF THE INVENTION

Fluorinated polymer compositions are used in the preparation of a wide variety of surface treatment materials to provide surface effects to substrates. Many such compositions are fluorinated acrylate polymers or copolymers which contain predominantly eight or more carbons in the perfluoroalkyl chain to provide the desired properties. Honda, et al., in *Macromolecules,* 2005, 38, 5699-5705 teach that for perfluoroalkyl chains of greater than 8 carbons, orientation of the perfluoroalkyl groups, designated $R_f$ groups, is maintained in a parallel configuration while for such chains having 6 or less carbons, reorientation occurs. This reorientation is recited to decrease surface properties such as contact angle. Thus, polymers containing shorter perfluoroalkyl chains have traditionally not been commercially successful.

Fluoroalkyl (meth)acrylate copolymers have been used in aqueous emulsions as in textile fabric treatment processes to provide coatings which impart desirable properties such as high levels of water-, alcohol-, and oil repellency to the fabrics. Aqueous emulsions of such fluoroalkyl (meth)acrylates copolymers, as disclosed in U.S. Pat. No. 5,344,903 require an additional heat-cure step after application in order to impart the desired repellency traits to the fibers.

BRIEF SUMMARY OF THE INVENTION

Water-based latex coating bases, such as those employed as paint coatings, have a tendency to have low oil-contact angles and poor cleanability ratings. To impart cleanability to interior and exterior paint surfaces, small molecule additives, including fluorosurfactants, have been used. Due to their small size, however, the additives do not provide long-term performance and durability in exterior paint, which undergoes more extreme conditions. Additionally, the small molecule additives can produce blooming in the surface of the paint.

The present invention addresses the issues described above by introducing compositions comprised of fluoroalkyl (meth)acrylate copolymers with short perfluoroalkyl groups of 6 or less carbons, made using hydrophilic chain transfer agents. Due to the polymeric nature, the compositions of the present invention provide performance as well as durability to the water-based latex coatings. Additionally, the hydrophilic chain transfer agent residues in the polymer aid the dispersion of the compositions in aqueous coatings. They impart unexpectedly desirable surface effects such as: increased water and oil contact angles, enhanced dirt pickup resistance, and enhanced cleanability to the coating films.

The present invention comprises a composition comprising an aqueous emulsion of Formula (I)

$$\left[\begin{array}{c}R_1\\ \vert\\ \cdots\\ \vert\\ C=O\\ \vert\\ A\\ \vert\\ Q\\ \vert\\ R_f\end{array}\right]_a \left[\begin{array}{c}R_2\\ \vert\\ \cdots\\ \vert\\ C=O\\ \vert\\ Z\\ \vert\\ (CH_2)_r\\ \vert\\ R_3{-}N{-}R_4\end{array}\right]_b \left[\begin{array}{c}R_2\\ \vert\\ \cdots\\ \vert\\ C=O\\ \vert\\ O^-\\ \vert\\ {}^+M\end{array}\right]_c \left[\begin{array}{c}R_2\\ \vert\\ \cdots\\ \vert\\ C=O\\ \vert\\ O\\ \vert\\ R_7\\ \left[O\atop R_7\right]_e\\ \vert\\ R_5\end{array}\right]_d \quad (I)$$

Unit A     Unit B     Unit C     Unit D wherein the composition of Formula (I) is a random copolymer;

$R_f$ is a straight or branched-chain perfluoroalkyl group of 2 to 6 carbon atoms, optionally interrupted by one or more —$CH_2$—, —CFH—, or combinations thereof;

A is O, S, or N(R'), wherein R' is H or an alkyl of from 1 to about 4 carbon atoms;

Q is a straight chain, branched chain or cyclic structures of alkylene, arylene, aralkylene, sulfonyl, sulfoxy, sulfonamido, carbonamido, carbonyloxy, urethanylene, ureylene, and combinations of such linking groups;

$R_1$ is H or $CH_3$;

$R_2$ is independently selected from H or an alkyl of 1 to about 4 carbon atoms;

r is independently 2 to 4;

Z is O or —NR'—, wherein R' is H or an alkyl of from 1 to about 4 carbon atoms;

$R_3$ and $R_4$ are each independently an alkyl of 1 to 4 carbon atoms, hydroxyethyl, benzyl, or $R_3$ and $R_4$ together with the nitrogen atom form a morpholine, pyrrolidine, or piperadine ring;

M is H, $HN(R_6)_3$, Na, Li, Cs, K, Ca, Mg, or mixtures thereof;

$R_6$ is H or an alkyl or hydroxyalkyl of 1 to 12 carbon atoms;

e is 0 to 40;

$R_5$ is H or an alkyl of 1 to 4 carbon atoms;

$R_7$ is a linear or branched alkylene of 2 to 4 carbon atoms;

a is 10 to 60 mol %;

b is 0 to 90 mol %;

c is 1 to 90 mol %; and d is 0 to 90 mol %;

wherein the sum of a+b+c+d is equal to 100%; and wherein said composition of formula (I) further comprises residue from a hydrophilic chain transfer agent of formula (II) $(Y{-}X{-}S)_g H_{2-g}$, wherein g is 1 or 2

X is a linear or branched alkylene of 1 to about 4 carbon atoms, optionally substituted with one or more hydrophilic functional groups selected from hydroxyl, carboxyl, or amine; and Y is a hydrophilic functional group selected from hydroxyl, carboxyl, thiol, or amine.

The present invention further comprises a method of imparting cleanability and dirt pickup resistance to a paint composition comprising contacting a pigmented coating with a polymer composition of Formula (I)

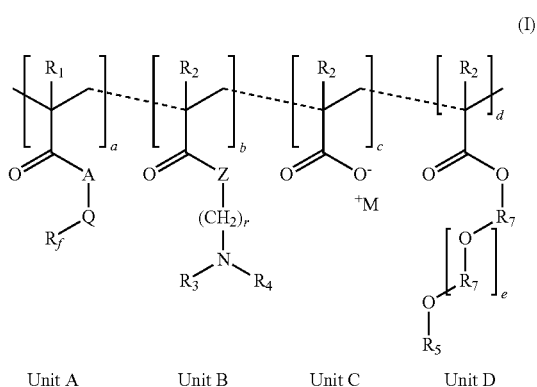

Unit A    Unit B    Unit C    Unit D wherein
the composition of Formula (I) is a random copolymer;
$R_f$ is a straight or branched-chain perfluoroalkyl group of 2 to 6 carbon atoms, optionally interrupted by one or more —$CH_2$—, —CFH—, or combinations thereof;
A is O, S, or N(R'), wherein R' is H or an alkyl of from 1 to about 4 carbon atoms;
Q is a straight chain, branched chain or cyclic structures of alkylene, arylene, aralkylene, sulfonyl, sulfoxy, sulfonamido, carbonamido, carbonyloxy, urethanylene, ureylene, and combinations of such linking groups;
$R_1$ is H or $CH_3$;
$R_2$ is independently selected from H or an alkyl of 1 to about 4 carbon atoms;
r is independently 2 to 4;
Z is O or —NR'—, wherein R' is H or an alkyl of from 1 to about 4 carbon atoms;
$R_3$ and $R_4$ are each independently an alkyl of 1 to 4 carbon atoms, hydroxyethyl, benzyl, or $R_3$ and $R_4$ together with the nitrogen atom form a morpholine, pyrrolidine, or piperadine ring;
M is H, $HN(R_6)_3$, Na, Li, Cs, K, Ca, Mg, or mixtures thereof;
$R_6$ is H or an alkyl or hydroxyalkyl of 1 to 12 carbon atoms;
e is 0 to 40;
$R_5$ is H or an alkyl of 1 to 4 carbon atoms;
$R_7$ is a linear or branched alkylene of 2 to 4 carbon atoms;
a is 10 to 60 mol %;
b is 0 to 90 mol %;
c is 1 to 90 mol %; and
d is 0 to 90 mol %;
wherein the sum of a+b+c+d is equal to 100%; and
wherein
said composition of formula (I) further comprises residue from a hydrophilic chain transfer agent of formula (II) (Y—X—S)$_g$H$_{2-g}$,
wherein
g is 1 or 2
X is a linear or branched alkylene of 1 to about 4 carbon atoms, optionally substituted with one or more hydrophilic functional groups selected from hydroxyl, carboxyl, or amine; and
Y is a hydrophilic functional group selected from hydroxyl, carboxyl, thiol, or amine.

DETAILED DESCRIPTION OF THE INVENTION

Herein trademarks are shown in upper case.
The terms (meth)acrylic or (meth)acrylate indicate, respectively, methacrylic and/or acrylic, and methacrylate and/or acrylate; and the term (meth)acrylamide indicates methacrylamide and/or acrylamide.

The present invention comprises a composition comprising an aqueous emulsion of Formula (I)

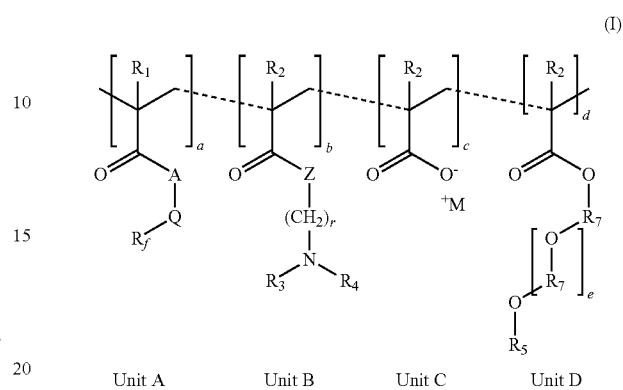

Unit A    Unit B    Unit C    Unit D wherein
the composition of Formula (I) is a random copolymer;
$R_f$ is a straight or branched-chain perfluoroalkyl group of 2 to 6 carbon atoms, optionally interrupted by one or more —$CH_2$—, —CFH—, or combinations thereof;
A is O, S, or N(R'), wherein R' is H or an alkyl of from 1 to about 4 carbon atoms;
Q is a straight chain, branched chain or cyclic structures of alkylene, arylene, aralkylene, sulfonyl, sulfoxy, sulfonamido, carbonamido, carbonyloxy, urethanylene, ureylene, and combinations of such linking groups;
$R_1$ is H or $CH_3$;
$R_2$ is independently selected from H or an alkyl of 1 to about 4 carbon atoms;
r is independently 2 to 4;
Z is O or —NR'—, wherein R' is H or an alkyl of from 1 to about 4 carbon atoms;
$R_3$ and $R_4$ are each independently an alkyl of 1 to 4 carbon atoms, hydroxyethyl, benzyl, or $R_3$ and $R_4$ together with the nitrogen atom form a morpholine, pyrrolidine, or piperadine ring;
M is H, $HN(R_6)_3$, Na, Li, Cs, K, Ca, Mg, or mixtures thereof;
$R_6$ is H or an alkyl or hydroxyalkyl of 1 to 12 carbon atoms;
e is 0 to 40;
$R_5$ is H or an alkyl of 1 to 4 carbon atoms;
$R_7$ is a linear or branched alkylene of 2 to 4 carbon atoms;
a is 10 to 60 mol %;
b is 0 to 90 mol %;
c is 1 to 90 mol %; and
d is 0 to 90 mol %;
wherein the sum of a+b+c+d is equal to 100%; and
wherein
said composition of formula (I) further comprises residue from a hydrophilic chain transfer agent of formula (II) (Y—X—S)$_g$H$_{2-g}$,
wherein
g is 1 or 2
X is a linear or branched alkylene of 1 to about 4 carbon atoms, optionally substituted with one or more hydrophilic functional groups selected from hydroxyl, carboxyl, or amine; and
Y is a hydrophilic functional group selected from hydroxyl, carboxyl, thiol, or amine.

The (meth)acrylate copolymers of Formula (I) comprise two or more repeating units derived from monomers from each of four groups. Monomers forming Unit A of Formula (I) are fluorinated monomers such as perfluoroalkylalkyl (meth)acrylates, monomers forming Unit B of Formula (I) are amine-containing monomers such as dialkylaminoalkyl (meth)acrylates or dialkylaminoalkyl (meth)acrylamides, monomers forming Unit C of Formula (I) are acidic monomers such as (meth)acrylic acid, and monomers forming Unit D of Formula (I) are hydrophilic monomers such as hydroxyalkyl (meth)acrylates or alkoxylated (meth)acrylates. The repeating units of Formula (I) can occur in any random sequence in the proportions described above.

Unit C is present in the polymer composition in at least 0.1 mol %, preferably in the range of 1 to about 60 mol %, and most preferably in the range of about 20 mol % to about 60 mol %. In one embodiment, Unit B is present in the polymer composition. In this embodiment, b is at least 0.1 mol %, preferably in the range of 1 to about 60 mol %, and most preferably in the range of about 20 mol % to about 60 mol %. In another embodiment, Unit D is present in the polymer composition. In this embodiment, d is at least 0.1 mol %, preferably in the range of 0.1 to about 60 mol %, and most preferably in the range of 0.1 to about 15 mol %. The polymer composition of Formula (I) can also be chosen such that all four of Units A, B, C, and D are present. In this embodiment, a is preferably about 25 to about 55 mol %, most preferably about 30 to about 50 mol %; b is preferably 10 to about 50 mol %, most preferably about 20 to about 40 mol %; c is preferably 10 to about 60 mol %, most preferably about 20 to about 40 mol %; and d is preferably 0.1 to about 30 mol %, most preferably 0.1 to about 15 mol %.

The random copolymer forming the aqueous emulsion of Formula (I) must have a molecular weight high enough to provide cleanability and durability but low enough to allow the polymer molecules to migrate through the coating medium. Preferably, the number average molecular weight $M_n$ is about 1500 to about 30,000 Daltons, more preferably about 5000 to about 20,000 Daltons, and most preferably about 8000 to about 15,000 Daltons. The weight average molecular weight $M_w$ is preferably about 5000 to about 50,000 Daltons, more preferably about 8000 to about 30,000 Daltons, and most preferably about 10,000 to about 20,000 Daltons. The polydispersity index (PDI) is preferably about 1.0 to about 6.0, preferably about 1.1 to about 2.0, and most preferably about 1.2 to about 1.6.

Fluorinated (meth)acrylate monomers useful for forming Unit A of Formula (I) are synthesized from the corresponding alcohols. These fluorinated (meth)acrylate compounds are prepared by either esterification of the corresponding alcohol with (meth)acrylic acid or by transesterification with methyl (meth)acrylate. Such preparations are well-known in the art.

Preferably, $R_f$ in Unit A of Formula (I) is a perfluoroalkyl group predominately containing from 2 to 6 carbon atoms, optionally interrupted by one or more —CH$_2$— or —CFH— groups. More particularly, $R_f$ in Formula (I) is a straight chain perfluoroalkyl group of 4 to about 6 carbon atoms.

One preferred embodiment of the monomer forming Unit A of Formula (I) is a perfluoroalkylethyl (meth)acrylate having the formula:

wherein m is 1 to about 3 or a mixture thereof, and preferably predominately 2 to about 3 or a mixture thereof, and R is H or methyl.

Examples of suitable linking groups Q in Unit A include straight chain, branched chain or cyclic structures of alkylene, arylene, aralkylene, sulfonyl, sulfoxy, sulfonamido, carbonamido, carbonyloxy, urethanylene, ureylene, and combinations of such linking groups such as sulfonamidoalkylene. Preferably, Q is a straight chain alkylene of 1 to about 15 carbon atoms or —CONR'(C$_n$H$_{2n}$)—, the (C$_n$H$_{2n}$) group is linear or branched, and preferably is linear. Within moiety A and Q, the alkyl in R' is linear or branched. Mixtures of fluorinated monomers may also be used.

Preferably, Z in Unit B is —O—, and r in Unit B is 2 or 3. $R_3$ and $R_4$ are preferably alkyls of 1, 2, or 3 carbon atoms. Examples of preferred monomers for forming Unit B of Formula (I) are diethylaminoethyl acrylate, and/or dimethylaminoethyl methacrylate.

Preferably, the monomers used to form Unit C of Formula (I) are acrylic acid or methacrylic acid; and M is NH$_4$ or Na, or a mixture thereof. Repeat units of Unit C can be formed by neutralizing the copolymer with a base, including but not limited to alkali metal hydroxides, alkali metal carbonates, ammonia, alkyl amines, or alkanolamines.

Preferred monomers for use in forming Unit D include one or more hydroxyalkyl (meth)acrylates, alkyloxy (meth)acrylates, or poly(alkylene glycol) (meth)acrylates. Suitable hydroxyalkyl (meth)acryl Where ates have alkyl chain lengths of 2 to 4 carbon atoms, and include 2-hydroxyethyl acrylate, 2-hydroxyethyl methacrylate, 3-hydroxypropyl acrylate, and 3-hydroxypropyl methacrylate. Preferably, $R_5$ is H or alkyl radical of 1 to 2 carbon atoms, and r is 2. Where Unit D is formed from one or more alkoxylated (meth)acrylates or poly(alkylene glycol) (meth)acrylates, suitable monomers may contain between 1 and 40 oxyalkylene units per molecule, preferably between 5 and 21 oxyalkylene units per molecule, and most preferably between 6 and 12 oxyalkylene units per molecule, and may preferably include ethyltriethyleneglycol (meth)acrylate, ethoxylated (meth)acrylates, poly(ethylene glycol) (meth)acrylates, poly(ethylene glycol) methyl ether (meth)acrylates, propoxylated (meth)acrylates, poly(propylene glycol) (meth)acrylates, or poly(propylene glycol) methyl ether (meth)acrylates.

The invention is further drawn to a method of forming the polymer composition of formula (I) comprising contacting a hydrophilic chain transfer agent of formula (II) (Y—X—S)$_g$ H$_{2-g}$ (II) with ethylenically unsaturated monomers comprising: 10 to 60 mol % of a fluorinated monomer, 0 to 90 mol % of an amine-containing monomer, 1 to 90 mol % of an acidic monomer, and 0 to 90 mol % of a hydrophilic monomer; wherein the sum of the monomers equals 100%.

The fluoropolymers in the present invention are prepared by polymerization of the fluorinated and nonfluorinated (meth)acrylate monomers. The polymerization process comprises contacting the fluorinated and non-fluorinated (meth) acrylate monomers as defined hereinabove in an organic solvent in the presence of a free radical initiator, hydrophilic chain transfer agent, and optionally other monomers in an inert atmosphere. For example, the monomers can be mixed in a suitable reaction vessel equipped with an agitation device. A heating source and a cooling source are provided as necessary. In a typical process, the fluorinated and non-fluorinated monomers are combined in the reaction vessel with the solvent and chain transfer agent to provide a reaction mixture, and the reaction mixture is heated to an appropriate temperature, e.g. 80° C. Alternatively, the monomers may be fed one at a time, or in a mixture, to an existing solution in a reaction vessel at a selected feed rate. In this embodiment, the existing solution in the reaction vessel may contain the solvent; the solvent and chain transfer agent; or the solvent, chain transfer agent, and one or more monomers. In another embodiment, the chain transfer agent may be fed alone, or in a mixture with one or more monomers, to an existing solution in a reaction vessel at a selected feed rate. In this embodiment, the existing solution in the reaction vessel may contain the solvent; the solvent and one or more monomers; or the solvent, one or more monomers, and the initiator. In each embodiment, the initiator may be included in the existing solution or may be fed into the reactor at a later time.

Temperatures in the range of 20-90° C. may be suitable where organic peroxides or azo compounds are used, depending, for example, on the choice of organic solvent and the choice of free radical initiator. Temperatures of 0-50° C. are suitable where oxidation-reduction (redox) initiators are used. The free radical initiator is typically added after the reaction mixture has reached the appropriate reaction or activation temperature.

Suitable free radical initiators include organic peroxides and azo compounds. Examples of particularly useful organic peroxides are benzoyl peroxide, t-butyl peroxide, acetyl peroxide, and lauryl peroxide. Examples of particularly useful azo compounds include 2,2'-azobis(2-amidinopropane dihydrochloride, 2,2'-azobis(isobutyramidine) dihydrochloride, and azodiisobutylronitrile. Azo initiators are commercially available from E.I. du Pont de Nemours and Company, Wilmington, Del., under the name of "VAZO".

Suitable redox initiators include potassium or ammonium peroxydisulfate; combinations of peroxides such as hydrogen peroxide with $Fe^{2+}$, $Cr^{2+}$, $V^{2+}$, $Ti^{3+}$, $Co^{2+}$, $Cu^+$; combinations of $HSO_3^-$, $SO_3^{2-}$, $S_2O_3^{2-}$, or $S_2O_5^{2-}$ with $Ag^+$, $Cu^{2+}$, $Fe^{3+}$, $ClO^{3-}$, or $H_2O_2$; combinations of organic alcohols with $Ce^{4+}$, $V^{5+}$, $Cr^{6+}$, or $Mn^{3+}$; and combinations of peroxydiphosphate compounds with $Ag^+$, $V^{5+}$, or $Co^{2+}$. Such systems may be used when low temperature or rapid activation is desirable.

The free radical initiator is generally added over a period of time after the reaction monomers have dissolved in the solvent and/or after the reaction mixture is at the desired temperature. The radical initiator is added in an effective amount. By an "effective amount" of a radical initiator is meant an amount sufficient to initiate the reaction between the monomers and preferably to sustain the reaction for a sufficient period of time to maximize yield of the polymer product. An effective amount of initiator will vary with the exact composition and reaction conditions used. An effective amount of initiator for a given set of conditions is easily determined experimentally by one skilled in the art.

The compositions of the present invention further comprise residue from a hydrophilic chain transfer agent, also known as a polymerization regulator. The term "residue" is herein defined as the portion of the chain transfer agent structure that is covalently bonded to the polymer molecule. The total polymer reaction mixture may also include some polymer molecules that do not contain the chain transfer agent residue.

The chain transfer agent can be used in amounts to limit or control the molecular weight of the fluoropolymer, typically in amounts of about 1 to 25 mol %, preferably about 2 to 20 mol %, more preferably about 3 to 15 mol %, and most preferably 5 to 10 mol %, based on the total amount of chain transfer agent and monomers employed. Suitable hydrophilic chain transfer agents have the formula

$$(Y-X-S)_g H_{2-g}, \qquad (II)$$

wherein g is 1 or 2; X is a linear or branched alkylene of 1 to about 4 carbon atoms, optionally substituted with one or more hydrophilic functional groups selected from hydroxyl, carboxyl, or amine; and Y is a hydrophilic functional group selected from hydroxyl, carboxyl, thiol, or amine. Where g=2, the chain transfer agents are disulfide compounds of the formula Y—X—S—S—X—Y. Preferred chain transfer agents include thioglycerol, mercaptoethanol, thioglycolic acid, dithioerythritol, 2-mercaptopropionic acid, and 3-mercaptopropionic acid, or mixtures thereof.

Suitable solvents are alkanes, alcohols and ketones having boiling points of less than 130° C. Suitable organic solvents useful in the preparation of the fluoropolymer include methyl isobutyl ketone, butyl acetate, tetrahydrofuran, acetone, isopropanol, ethyl acetate, methylene chloride, chloroform, carbon tetrachloride, cyclohexane, hexane, dioxane, hexafluoroisopropanol, and mixtures of two or more thereof.

Cyclohexane, isopropanol, methyl isobutyl ketone, or mixtures thereof are preferred. Blends of isopropanol and methyl isobutyl ketone are particularly preferred, since both solvents form azeotropes with water boiling below 100° C., facilitating their removal from the final aqueous dispersion. Blends of organic solvents with other types of co-solvents, including water, may also be used. Preferred are isopropanol/methyl isobutyl ketone blends containing between about 20% and about 80% of methyl isobutyl ketone.

The copolymer as described above used in the method of the present invention is preferably in the form of an aqueous dispersion. After the polymerization is complete, as can be monitored by $^1H$ NMR, the acidic polymer solution can be neutralized using a basic water solution to form an aqueous dispersion. The amount of base necessary is calculated by assuming complete salt formation of all acid functionalities. Optionally 0-5% mole percent excess of base is added to ensure conversion of all acid to salt. The final pH of the emulsion is between about 6 and about 9, and preferably is between 6 and 8. The bases suitable for the neutralization are alkali metal hydroxides, alkali metal carbonates, ammonia, alkyl amines, or alkanolamines. Ammonia solution is preferred. Following neutralization, the organic solvents may be removed by distillation to form a completely aqueous system.

The fluoropolymer composition produced as described above may be used directly in a coating composition, or added solvent (the "application solvent") may be added to achieve a desirable solids content. The application solvent is typically a solvent selected from the group consisting of alcohols and ketones.

The fluoropolymer composition is useful as a coating additive, wherein the fluoropolymer composition can be added to a coating base, which is applied to a substrate. Thus, the present invention provides a method of imparting cleanability to a paint composition comprising contacting a pigmented coating with a polymer composition of formula (I) wherein the composition of Formula (I) is a random copolymer;

$R_f$ is a straight or branched-chain perfluoroalkyl group of 2 to 6 carbon atoms, optionally interrupted by one or more —$CH_2$—, —CFH—, or combinations thereof;

A is O, S, or N(R'), wherein R' is H or an alkyl of from 1 to about 4 carbon atoms;

Q is a straight chain, branched chain or cyclic structures of alkylene, arylene, aralkylene, sulfonyl, sulfoxy, sulfonamido, carbonamido, carbonyloxy, urethanylene, ureylene, and combinations of such linking groups;

$R_1$ is H or $CH_3$;

$R_2$ is independently selected from H or an alkyl of 1 to about 4 carbon atoms;

r is independently 2 to 4;

Z is O or —NR'—, wherein R' is H or an alkyl of from 1 to about 4 carbon atoms;

$R_3$ and $R_4$ are each independently an alkyl of 1 to 4 carbon atoms, hydroxyethyl, benzyl, or $R_3$ and $R_4$ together with the nitrogen atom form a morpholine, pyrrolidine, or piperadine ring;

M is H, $HN(R_6)_3$, Na, Li, Cs, K, Ca, Mg, or mixtures thereof;

$R_6$ is H or an alkyl or hydroxyalkyl of 1 to 12 carbon atoms;

e is 0 to 40;

$R_5$ is H or an alkyl of 1 to 4 carbon atoms;

a is 10 to 60 mol %;

b is 0 to 90 mol %;

c is 1 to 90 mol %; and d is 0 to 90 mol %;

wherein the sum of a+b+c+d is equal to 100%; and wherein said composition of formula (I) further comprises residue from a hydrophilic chain transfer agent of formula (II) $(Y-X-S)_g H_{2-g}$, wherein g is 1 or 2

X is a linear or branched alkylene of 1 to about 4 carbon atoms, optionally substituted with one or more hydrophilic functional groups selected from hydroxyl, carboxyl, or amine; and Y is a hydrophilic functional group selected from hydroxyl, carboxyl, thiol, or amine.

The compositions of the present invention provide dried coatings with oil stain cleanability ratings ΔC of at least 2.0, preferably at least 3.0, and dirt pickup resistance ΔL of at most 4.5, preferably 4.0, when added to a coating base. As used herein, the term "coating base" is a composition, typically a water-based latex paint that is applied to a substrate for the purpose of creating a lasting film on the substrate surface. Typically, these contain resins such as acrylics, epoxies, vinyls, polyurethanes and others. Such paints are readily available in the marketplace under a number of major brands. These coating bases include inerior house paints, exterior house paints, stains, and similar coatings. Thus, the present invention relates to a coating comprising a coating base and a polymer composition of formula (I). Such coatings may be pigmented or unpigmented.

When used as an additive to a coating base, the fluoropolymer composition as described herein is effectively introduced to the coating base by thoroughly contacting, e.g., by mixing the fluoropolymer composition with the coating base. The contacting of fluoropolymer and coating base can be performed, for example and conveniently, at ambient temperature. More elaborate contacting or mixing methods can be employed such as using a mechanical shaker or providing heat. Such methods are generally not necessary and generally do not substantially improve the final coating composition.

When used as an additive to a coating base, the composition of the invention is generally added at about 0.001 weight % to about 1 weight % on a dry weight basis of the fluoropolymer to the weight of the wet paint. Preferably about from about 0.01 weight % to about 0.5 weight %, and more preferably from about 0.05 weight % to about 0.25 weight % of the fluoropolymer is added to the paint.

The coating compositions of the present invention are useful for providing a protective and/or decorative coating to a wide variety of substrates. Such substrates include primarily construction materials and hard surfaces. The substrate is preferably selected from the group consisting of wood, metal, wallboard, masonry, concrete, fiberboard, and paper. Other materials may also be used as the substrate.

The coatings of the present invention may be used to treat a substrate by contacting the substrate with a coating composition comprising a coating base and a polymer composition of formula (I) and drying or curing the coating composition on the substrate. Any method of contacting a coating composition with a substrate can be used. Such methods are well known to a person skilled in the art, such as by brush, spray, roller, doctor blade, wipe, dip, foam, liquid injection, immersion or casting.

The compositions of the present invention provide performance as well as durability to the water-based latex coatings. They impart unexpectedly desirable surface effects such as: increased water and oil contact angles, enhanced dirt pickup resistance, and enhanced cleanability to the coating films. For these reasons, the composition of the present invention is particularly suitable for use as additives to exterior coating and paints.

MATERIALS AND TEST METHODS

All solvents and reagents, unless otherwise indicated, were purchased from Sigma-Aldrich and used directly as supplied. 1H,1H,2H,2H-perfluorooctyl methacrylate and 1H,1H,2H,2H-perfluorooctyl acrylate were obtained from DuPont Chemicals & Fluoroproducts. Molecular weight analysis was performed using a Size Exclusion Chromatography (SEC) system [Alliance 2695™, Waters Corporation (Milford, Mass.)] equipped with with a differential refractive index detector, multi-angle light scattering photometer and a differential capillary viscometer ViscoStar™.

Test Methods

Dosing of Polymer Additives in Paint and Test Panel Application

Aqueous dispersions of fluoroacrylic copolymers of the present invention were added at 350 ppm fluorine levels to selected commercially available interior and exterior latex paints that were, prior to dosing, free of fluoroadditives. The sample was mixed using an overhead Cowles Blade stirrer at 600 rpm for 10 minutes. The mixture was then transferred to a glass bottle, sealed and placed on a roll mill overnight to allow uniform mixing of the fluoropolymer. The samples were then drawn down uniformly on a black Leneta Mylar® card (5.5"×10") or Aluminium Q-panel (4"×12") via a BYK-Gardner drawdown apparatus using 5 mL bird-applicator. The paint films were then allowed to dry at room temperature for 7 days.

Test Method 1. Evaluation of Oil Repellency Via Contact Angle Measurement

Oil contact angle measurements were used to test for the migration of fluoroadditive to the surface of the paint film. Oil contact angle testing was performed by goniometer on 1 inch strips of Leneta panel coated with dried paint film. A Ramé-Hart Standard Automated Goniometer Model 200 employing DROPimage standard software and equipped with an automated dispensing system, 250 µl syringe, and illuminated specimen stage assembly was used. The goniometer camera was connected through an interface to a computer, allowing the droplet to be visualized on a computer screen. The horizontal axis line and the cross line could both be independently adjusted on the computer screen using the software. Prior to contact angle measurement, the sample was placed on the sample stage and the vertical vernier was adjusted to align the horizontal line (axis) of the eye piece coincident to the horizontal plane of the sample. The horizontal position of the stage relative to the eye piece was positioned so as to view one side of the test fluid droplet interface region at the sample interface.

To determine the contact angle of the test fluid on the sample, approximately one drop of test fluid was dispensed onto the sample using a 30 µL pipette tip and an automated dispensing system to displace a calibrated amount of the test fluid. For oil contact angle measurements, hexadecane was suitably employed. Horizontal and cross lines were adjusted via the software in case of the Model 200 after leveling the sample via stage adjustment, and the computer calculated the contact angle based upon modeling the drop appearance. The initial contact angle is the angle determined immediately after dispensing the test fluid to the sample surface. Initial contact angles above 30 degrees are indicators of effective oil repellency.

Test Method 2. Dirt Pick-Up Resistance (DPR) Test for Exterior Paints

DPR testing was used to evaluate the ability of the painted panels to prevent dirt accumulation. An artificial dry dirt comprised of silica gel (38.7%), aluminum oxide powder (38.7%), black iron oxide powder (19.35%) and lamp black powder (3.22%) was used for this test. The dust components were mixed and placed on a roller for 48 h for thorough mixing and stored in a decicator.

Exterior paint samples were drawn down to Aluminium Q-panels cut to a size of 1.5"×2", and four replicates of these samples were taped onto a 4"×6" metal panel. The initial whiteness ($L^*_{initial}$) of each Q-panel was measured using a Hunter Lab colorimeter. The 4"×6" metal panel was then inserted into a 45 degree angle slot cut in a wooden block. The dust applicator containing metal mesh dispensed the dust on the panels until the panels were completely covered with dust. The excess dust was then removed by lightly tapping the mounted panels 5 times on the wooden block inside the shallow tray. The 4"×6" panel which held the dusted panels was then clamped onto a Vortex-Genie 2 for 60 seconds to remove any remaining dust. The panel was then removed and tapped 10 times to dislodge any remaining dust. The whiteness ($L^*_{dusted}$) of each 1.5"×2" sample was re-measured using the same colorimeter, and the difference in whiteness before and after dusting was recorded. The values were averaged. DPR is expressed in terms of $\Delta L^*$, where $\Delta L^* = (L^*_{initial} - L^*_{dusted})$. A lower $\Delta L^*$ value indictes better dirt pick-up resistance.

Test Method 3. Leneta Oil Stain Cleanability for Interior Paints

A modified version of ASTMD3450 was used to determine the oil stain cleanability of painted panels. The test material dosed in interior flat paint was applied to a black Leneta card as described in the application method. The dried samples were cut into a 4"×3" size for testing. A thin, evenly laid layer of Leneta staining medium (5 wt. % dispersion of Leneta carbon black in Vaseline®) was placed on half of the film, and left for 1 hour. The excess stain was gently scrapped off and wiped with a clean paper towel until no visible stain could be wiped off. The panel was then moved to an Gardco abrasion tester covered with 8 layers of cheese cloth at the washing block. The cheesecloth was moisturized with 10 mL of 1% mild detergent solution in water and performed washability via moving the washing block over the stained panel. After 5 cycles, the panel was rinsed with deionized water and left to dry for 12 hours. The whiteness of the unwashed stained paint and washed stained paint were measured using a Hunter lab colorimeter to obtain L values. Cleanability was calculated as per the equation: Cleanability=$(L_{washed\ paint} - L_{unwashed\ stained\ paint}) \times 10 / (L_{unstained\ paint} - L_{unwashed\ stained\ paint})$. Similarly a cleanability rating for a control sample that is devoid of fluorinated additive was accessed simultaneously. The difference between the cleanability rating of the sample to the control were determined and represented as a cleanability score $\Delta C$. The higher the $\Delta C$ the better the performance, suggesting that relatively lower amounts of stain remains on the treated sample compared to control. A negative $\Delta C$ indicates that the sample is worse than the control.

EXAMPLES

Example 1

A three-necked round-bottomed flask equipped with a reflux condenser, septum, and thermocouple was charged with 1H,1H,2H,2H-perfluorooctyl methacrylate (6.80 g, 15.73 mmol), diethylamino ethyl methacrylate, (2.19 g, 11.82 mmol), methacrylic acid, (1.02 g, 11.85 mmol), poly (ethylene glycol) methacrylate, methyl ether, (average $M_n$ 950, 0.20 g, 0.21 mmol), methyl isobutyl ketone (MIBK), (3.75 g, 37.44 mmol), isopropanol (IPA) (11.25 g), and 1-thioglycerol, (0.40 g, 3.70 mmol). The flask was left to sparge with $N_2$ gas for one hour at room temperature. The flask was heated as to reach an internal temperature of 80° C. using an oil bath, and a solution of VAZO-67, (0.20 g, 1.04 mmol) in MIBK (1 g) was added in one portion by syringe. The internal temperature was allowed to rise to 80° C. again, before the reaction was left to stir for an additional 16 hours. The reaction mixture was allowed to cool to room temperature, and $^1$H NMR analysis confirmed >97% monomer conversion. The polymer sample was analyzed by GPC for average molecular weight: $M_n$=11.2 kDa, $M_w$=13.8 kDa, PDI=1.24.

To a 3.0 g aliquot of the polymer solution in MIBK/IPA was added water (4.8 g) followed by 28 wt % aqueous ammonia solution until the mixture reached a pH of 7-8. The mixture was heated at 60° C. for 4 hours, and the organic solvents were distilled out under vacuum to obtain a 14 wt % dispersion of a clear polymer in water. A calculated amount of this polymer dispersion (350 ppm of F) was added to samples of exterior and interior test paints and the drawdown panels were evaluated as per the test methods described.

Comparative Example 1A

This comparative example describes the synthesis of the polymer composition described in Example 1, without the use of a chain transfer agent.

By following a similar procedure described in Example 1, polymerization of 1H,1H,2H,2H-perfluorooctyl methacrylate, (6.80 g, 15.73 mmol), diethylamino ethyl methacrylate (2.19 g, 11.82 mmol), methacrylic acid, (1.02 g, 11.85 mmol), poly (ethylene glycol) methacrylate, methyl ether, (average $M_n$ 950, 0.20 g, 0.21 mmol), in MIBK (3.75 g), IPA (11.25 g) and VAZO-67 (0.20 g, 1.04 mmol) resulted in a yellow solution. The monomer conversion was >98% by NMR. The molecular weight analysis estimated: $M_n$=30,390 Da, $M_w$=56,870 Da and PDI 1.87.

A 3.0-g aliquot of the polymer solution was dispersed in water (4.8 g) by heating with 28 wt % aqueous ammonia solution until the mixture reached a pH of 7-8. Removal of the organic solvents under vacuum provided an 11 wt % dispersion of a clear polymer dispersion in water. A calculated amount of this polymer dispersion (350 ppm of F) was added to samples exterior and interior test paints and the drawdown panels evaluated as per the test methods described.

Example 2

By following a similar procedure described in Example 1, polymerization of 1H,1H,2H,2H-perfluorooctyl methacrylate, (6.80 g, 15.73 mmol), diethylamino ethyl methacrylate (2.19 g, 11.82 mmol), methacrylic acid, (1.02 g, 11.85 mmol), poly (ethylene glycol) methacrylate (average $M_n$ 550, 0.20 g, 0.36 mmol) in a solution of MIBK (3.75 g), IPA (11.25 g) and 1-thioglycerol (0.40 g, 3.70 mmol), using VAZO-67 (0.20 g, 1.04 mmol) initiator provided a yellow polymer solution. The monomer conversion was >96% by $^1$H NMR. The molecular weight analysis estimated $M_n$=12.9 kDa, $M_w$=17.4 kDa, and PDI 1.35.

A 3.0-g aliquot of the polymer solution was dispersed in water (4.8 g) by heating with 28 wt % aqueous ammonia solution until the mixture reached a pH of 7-8. Removal of the organic solvents under vacuum provided a 11 wt % dispersion of a clear polymer dispersion in water. A calculated amount of this polymer dispersion (350 ppm of F) was added to samples of exterior and interior test paints and the drawdown panels evaluated as per the test methods described.

Example 3

By following a similar procedure described in Example 1, polymerization of 1H,1H,2H,2H-perfluorooctyl methacrylate, (6.80 g, 15.73 mmol), diethylamino ethyl methacrylate (2.19 g, 11.82 mmol), methacrylic acid, (1.02 g, 11.85 mmol), (hydroxyethyl)methacrylate, (0.20 g, 1.54 mmol) in a solution of MIBK (3.75 g), IPA (11.25 g), 1-thioglycerol (0.40 g, 3.70 mmol), and VAZO-67 (0.20 g, 1.04 mmol) resulted in a yellow solution. The monomer conversion was >94% by $^1$H NMR. The molecular weight analysis estimated $M_n$=12.6 kDa, $M_w$=17.4 kDa, and PDI 1.39.

A 3.0-g aliquot of the polymer solution was dispersed in water (4.8 g) by heating with 28 wt % aqueous ammonia solution until the mixture reached a pH of 7-8. Removal of the organic solvents under vacuum provided a 14 wt % dispersion of a clear polymer dispersion in water. A calculated amount of this polymer dispersion (350 ppm of F) was added to samples of exterior and interior test paints and the drawdown panels evaluated as per the test methods described.

Example 4

A three-necked round-bottomed flask equipped with a reflux condenser, septum, and thermocouple was charged with a solution of 1-thioglycerol (0.839 g, 7.76 mmol) in 21.8 ml of MIBK/IPA (1:3 w/w) solution. The solution was heated to 80° C., and then simultaneously fed a monomer mixture of 1H,1H,2H,2H-perfluorooctyl methacrylate (14.53 g, 33.64 mmol), poly(ethylene glycol) methyl ether (average $M_n$ of 300, 6.31 g, 21.02 mmol), methacrylic acid (2.53 g, 29.44 mmol), sodium chloride (0.018 g, 0.31 mmol) in 40 ml of MIBK/IPA and VAZO-67 (0.428 g, 2.23 mmol) in 9 ml of MIBK/IPA over a period of 6 hours via syringe pump. The reaction mixture was allowed to stir at 80° C. under nitrogen for 18 hours. The resulting solution was neutralized with sodium hydroxide solution (1 equivalent to methacrylic acid), and then the organic solvent was removed under vacuum to provide 33.9 wt % aqueous polymer solution. The molecular weight analysis estimated $M_n$=9.1 kDa, $M_w$=13.0 kDa, and PDI 1.43.

A calculated amount of this polymer dispersion (350 ppm of fluorine) was added to samples of exterior and interior test paints and the drawdown panels evaluated as per the test methods described.

Example 5

By using a procedure described in Example 4, polymerization using 1H,1H,2H,2H-perfluorooctyl methacrylate (14.53 g, 33.64 mmol), poly(ethylene glycol) methyl ether (average $M_n$ of 470, 9.88 g, 21.02 mmol), methacrylic acid, (2.53 g, 29.44 mmol), sodium chloride (0.018 g, 0.31 mmol), 1-thioglycerol (0.839 g, 7.76 mmol) and VAZO-67 (0.428 g, 2.23 mmol) in MIBK/IPA provided a pale yellow polymer in solution. Neutralization using aqueous sodium hydroxide solution (1 equivalent to methacrylic acid), followed by evaporation of solvent provided a 33.5 wt % aqueous polymer solution. The molecular weight analysis estimated $M_n$=11.1 kDa, $M_w$=18.1 kDa, and PDI 1.63.

A calculated amount of this polymer dispersion (350 ppm of fluorine) was added to samples of exterior and interior test paints and the drawdown panels evaluated as per the test methods described.

Example 6

By using a procedure described in Example 4, polymerization using 1H,1H,2H,2H-perfluorooctyl methacrylate (14.53 g, 33.64 mmol), poly(ethylene glycol) methacrylate (average $M_n$ of 526, 11.06 g, 21.02 mmol), methacrylic acid, (2.53 g, 29.44 mmol), sodium chloride (0.018 g, 0.31 mmol), 1-thioglycerol (0.839 g, 7.76 mmol), and VAZO-67 (0.428 g, 2.23 mmol) in MIBK/IPA provided a pale yellow polymer solution. Neutralization using aqueous sodium hydroxide solution (1 equivalent to methacrylic acid), followed by evaporation of solvent provided a 37.1 wt % aqueous polymer solution. The molecular weight analysis estimated $M_n$=8.4 kDa, $M_w$=45.6 kDa, and PDI 5.44.

A calculated amount of this polymer dispersion (350 ppm of fluorine) was added to samples of exterior and interior test paints and the drawdown panels evaluated as per the test methods described.

Example 7

1-Thioglycerol (1.62 g, 15 mmol) and MIBK/IPA mixture (7 mL, 1:2.2 w/w) were charged to a 250 mL three-neck round bottom flask under nitrogen with stirring. The solution was heated to 80° C. followed by separate feeding of monomer mixtures (2-(perfluorohexyl)ethyl) methacrylate (formula 1H,1H,2H,2H-perfluorooctyl methacrylate, 17.3 g, 40 mmol) and methacrylic acid (4.3 g, 50 mmol) in MIBK/IPA mixture (3 mL, 1:2.2 w/w) and VAZO-67 (0.43 g, 2.24 mmol) in MIBK/IPA mixture (19 mL, 1:2.2 w/w) over a time period of 6 hours. The reaction mixture was allowed to stir at 80° C. under nitrogen for 18 hours. The reaction mixture was neutralized with sodium hydroxide solution (1 equivalent to methacrylic acid). The organic solvent was removed to produce a 12.8 wt. % solution of the polymer in water. The molecular weight analysis estimated $M_n$=3.1 kDa, $M_w$=6.2 kDa and PDI 2.0.

A calculated amount of this polymer dispersion (350 ppm of fluorine) was added to samples of exterior and interior test paints and the drawdown panels evaluated as per the test methods described.

Example 8

3-Mercaptopropionic acid (1.8 g, 17 mmol) and water/IPA mixture (7 mL, 1:4 w/w) were charged to a 250-mL three-neck round bottom flask under nitrogen with stirring. The solution was heated to 80° C. followed by separate feeding of monomer mixtures 1H,1H,2H,2H-perfluorooctyl methacrylate, 17.3 g, 40 mmol) and methacrylic acid (4.3 g, 50 mmol)) in water/IPA (3 mL, 1:4 w/w) and VAZO 68 (0.63 g, 2.24 mmol) in water/IPA (19 mL, 1:4 w/w) over a time period of 6 hours. The reaction mixture was allowed to stir at 80° C. under nitrogen for 18 hours. The reaction mixture was neutralized with sodium hydroxide solution (1 equivalent to methacrylic acid). The organic solvent was removed to produce a 13.7 wt. % solution of polymer in water. The molecular weight analysis estimated $M_n$=9.5 kDa, $M_w$=13.5 kDa and PDI 1.43.

A calculated amount of this polymer dispersion (350 ppm of fluorine) was added to samples of exterior and interior test paints and the drawdown panels evaluated as per the test methods described.

Example 9

A 250 mL three-necked round-bottomed flask equipped with a reflux condenser, septum, and thermocouple was charged with 1H,1H,2H,2H-perfluorooctyl methacrylate (14.58 g, 33.8 mmol), 2-(diethylamino)ethyl methacrylate (3.57 g, 19.3 mmol), methacrylic acid (2.67 g, 31.0 mmol), followed by MIBK, (10.0 g, 100 mmol), IPA (27.5 g, 458 mmol), and 2-mercaptoethanol (0.840 g, 10.75 mmol). The reaction solution was subjected to sub-surface sparging with $N_2$, using a needle, for 1 h at room temperature. The flask was heated as to reach an internal temperature of 80° C. using an oil bath, and a solution of VAZO-67 (0.395 g, 2.05 mmol), in methyl isobutyl ketone (2 mL) was added in one portion by a syringe. The internal temperature was allowed to rise to 80° C. again, before the reaction was left to stir for an additional 16-22 hours. The reaction mixture was allowed to cool to room temperature and $^1$H NMR analysis confirmed >95% monomer conversion. The polymer sample was analyzed by GPC for average molecular weight, $M_n$=2.8 kDa, $M_w$=5.8 kDa, PDI=2.05.

The reaction mixture was reheated to 80° C. A neutralization solution of NaOH (1.21 g, 31.0 mmol), in $H_2O$ (58.3 g) was heated to 45° C. and added dropwise via addition funnel over 20 minutes to achieve a clear solution. The mixture was heated at 80° C. for an additional hour and the organic solvents were removed via rotary evaporation to obtain a hazy yellow dispersion (14.9% solids, pH 11) in water. A calculated amount of this polymer dispersion (1.17 g, 350 ppm of F) was added to samples of exterior and interior paints and the drawdown panels were evaluated as per the test methods described.

Comparative Example 9A

By following a similar procedure as described in Example 9, batch polymerization of 1H,1H,2H,2H-perfluorooctyl methacrylate (14.58 g, 33.8 mmol), 2-(diethylamino)ethyl methacrylate (3.57 g, 19.3 mmol) and methacrylic acid, (2.67 g, 31.0 mmol), using VAZO-67 (0.395 g, 2.05 mmol) initiator and 1-dodecanethiol (0.840 g, 4.15 mmol) chain transfer agent provided the polymer solution with >95% monomer conversion ($^1$H NMR). The polymer sample was analyzed by GPC for average molecular weight, $M_n$=7.0 kDa, $M_w$=12.9 kDa, PDI=1.86.

Neutralization of the polymer using NaOH (1.21 g, 31.0 mmol), in $H_2O$ (58.3 g) followed by removal of the organic solvents under vacuum provided a hazy yellow dispersion (24.4% solids, pH 11) in water. A calculated amount of this polymer dispersion (0350 ppm of F) was added to samples of exterior and interior test paints and the drawdown panels evaluated as per the test methods described.

Example 10

A 250 mL three-necked round-bottomed flask was equipped with a reflux condenser, septum, and thermocouple was charged with MIBK (9.0 g, 90.9 mmol) and IPA (20.0 g, 333.3 mmol). The reaction solution was subjected to sub-surface sparging with $N_2$, using a needle, for 1 h at room temperature. 1H,1H,2H,2H-perfluorooctyl methacrylate (14.58 g, 33.8 mmol), 2-(diethylamino)ethyl methacrylate (3.57 g, 19.3 mmol) and methacrylic acid, (2.67 g, 31.0 mmol) were charged into a separate 100 mL one-necked round-bottomed flask and capped with a septa. To the monomer containing flask was added pre-sparged solvent to bring the total volume to 20 mL. The monomer solution was subjected to sub-surface sparging with $N_2$, using a needle, for 1 h at room temperature. VAZO-67 (0.395 g, 2.05 mmol) was dissolved into the pre-sparged solvent to bring total volume to 20 mL. 1-thioglycerol (0.840 g, 7.76 mmol) was added to the reaction flask containing the remaining amount of sparged solvent. The flask was heated as to reach an internal temperature of 80° C. using an oil bath. The syringes containing monomer and initiator were independently set to deliver their contents over a period of 6 h using a duel syringe pump. After complete delivery of the syringe contents, the reactor was allowed to stir for an additional 14 h. The reaction mixture was allowed to cool to room temperature and $^1$H NMR analysis confirmed >95% monomer conversion. The polymer sample was analyzed by GPC for average molecular weight, $M_n$=13.9 kDa, $M_w$=62.5 kDa, PDI=4.6. The reaction mixture was reheated to 80° C.

A neutralization solution of NaOH (1.88 g, 47.0 mmol), in $H_2O$ (58.3 g mmol) was heated to 45° C. and added dropwise via addition funnel over 20 minutes to achieve a clear solution. The mixture was heated at 80° C. for additional hours and the organic solvents were removed via rotary evaporation to obtain a hazy yellow dispersion (16.0 wt. % solids, pH 11) in water. A calculated amount of this polymer dispersion (350 ppm of F) was added to samples of exterior and interior test paints and the drawdown panels evaluated as per the test methods described.

Comparative Example 10A

By following a similar procedure as described in Example 10, semi-batch polymerization of 1H,1H,2H,2H-perfluorooctyl methacrylate (14.58 g, 33.8 mmol), 2-(diethylamino) ethyl methacrylate (3.57 g, 19.3 mmol) and methacrylic acid, (2.67 g, 31.0 mmol), using VAZO-67 (0.395 g, 2.05 mmol) initiator, provided the polymer solution with >95% monomer conversion ($^1$H NMR). The polymer sample was analyzed by GPC for average molecular weight, $M_n$=12.0 kDa, $M_w$=24.2 kDa, PDI=2.02.

Neutralization of the polymer using NaOH (1.88 g, 47.0 mmol), in $H_2O$ (58.3 g) followed by removal of the organic solvents under vacuum provided a cloudy yellow dispersion (21.7 wt. % solids, pH 11) in water. A calculated amount of this polymer dispersion (0350 ppm of F) was added to samples exterior and interior paints and the drawdown panels evaluated as per the test methods described.

Comparative Example 10B

By following a similar procedure as described in Example 10, semi-batch polymerization of 1H,1H,2H,2H-perfluorooctyl methacrylate (14.58 g, 33.8 mmol), 2-(diethylamino)ethyl methacrylate (3.57 g, 19.3 mmol) and methacrylic acid, (2.67 g, 31.0 mmol), using VAZO-67 (0.395 g, 2.05 mmol) initiator, and 1H,1H,2H,2H-Perfluorooctanethiol (0.840 g, 2.21 mmol) as chain transfer agent provided the polymer solution with >95% monomer conversion ($^1$H NMR). The polymer sample was analyzed by GPC for average molecular weight, $M_n$=11.2 kDa, $M_w$=20.5 kDa, PDI=1.83

Neutralization of the polymer using NaOH (1.88 g, 47.0 mmol), in $H_2O$ (58.3 g) followed by removal of the organic solvents under vacuum provided a cloudy yellow dispersion (22.7 wt. % solids, pH 11) in water. A calculated amount of this polymer dispersion (0350 ppm of F) was added to samples exterior and interior paints and the drawdown panels evaluated as per the test methods described.

Example 11

By following a similar procedure as described in Example 10, semi-batch polymerization of 1H,1H,2H,2H-perfluorooctyl methacrylate (14.58 g, 33.8 mmol), 2-(diethylamino)ethyl methacrylate (3.57 g, 19.3 mmol), and methacrylic acid, (2.67 g, 31.0 mmol), using VAZO-67 (0.395 g, 2.05 mmol) initiator and a mixture of 1-thioglycerol/mercaptoethanol (0.420 g, 3.88 mmol)/(0.420 g. 5.37 mmol) chain transfer agents, provided the polymer solution with >95% monomer conversion ($^1$H NMR). The polymer sample was analyzed by GPC for average molecular weight, $M_n$=10.6 kDa, $M_w$=18.0 kDa, PDI=1.70.

Neutralization of the polymer using NaOH (1.88 g, 47.0 mmol), in $H_2O$ (58.3 g, 3239 mmol) followed by removal of the organic solvents under vacuum provided a hazy yellow dispersion (24 wt. % solids, pH 11) in water. A calculated amount of this polymer dispersion (350 ppm of F) was added to samples of exterior and interior test paints and the drawdown panels evaluated as per the test methods described.

Example 12

By following a similar procedure as described in Example 10, semi-batch polymerization of 1H,1H,2H,2H-perfluorooctyl methacrylate (14.58 g, 33.8 mmol), 2-hydroxyethyl methacrylate (2.51 g, 19.3 mmol) and methacrylic acid, (2.67 g, 31.0 mmol), using VAZO-67 (0.395 g, 2.05 mmol) initiator, provided the polymer solution with >95% monomer conversion ($^1$H NMR). The polymer sample was analyzed by GPC for average molecular weight, $M_n$=5.3 kDa, $M_w$=9.9 kDa, PDI=1.85.

Neutralization of the polymer using $NH_4OH$ (2.87 g, 47.0 mmol), in $H_2O$ (58.3 g) followed by removal of the organic solvents under vacuum provided a cloudy yellow dispersion (21.7% solids, pH 7-8) in water. A calculated amount of this polymer dispersion (350 ppm of F) was added to samples of exterior and interior test paints and the drawdown panels evaluated as per the test methods described.

Comparative Example 12A

By following a similar procedure as described in Example 10, semi-batch polymerization of 1H,1H,2H,2H-perfluorooctyl methacrylate (14.58 g, 33.8 mmol), 2-hydroxyethyl methacrylate (2.51 g, 19.3 mmol) and methacrylic acid, (2.67 g, 31.0 mmol), using VAZO-67 (0.395 g, 2.05 mmol) initiator and 1-thioglycerol (0.840 g 7.76 mmol) chain transfer agent, provided the polymer solution with >95% monomer conversion ($^1$H NMR). The polymer sample was analyzed by GPC for average molecular weight, $M_n$=20.9 kDa, $M_w$=29.5 kDa, PDI=1.41.

Neutralization of the polymer using $NH_4OH$ (2.87 g, 47.0 mmol), in $H_2O$ (58.3 g) followed by removal of the organic solvents under vacuum provided a cloudy yellow dispersion (21.9% solids, pH 7-8) in water. A calculated amount of this polymer dispersion (350 ppm of F) was added to samples of exterior and interior test paints and the drawdown panels evaluated as per the test methods described.

Example 13

By following a similar procedure as described in Example 10, semi-batch polymerization of 1H,1H,2H,2H-perfluorooctyl methacrylate (14.58 g, 33.8 mmol), 2-hydroxypropyl methacrylate (2.78 g, 19.3 mmol) and methacrylic acid, (2.67 g, 31.0 mmol), using VAZO-67 (0.395 g, 2.05 mmol) initiator and 1-thioglycerol (0.840 g 7.76 mmol) chain transfer agent, provided the polymer solution with >95% monomer conversion ($^1$H NMR). The polymer sample was analyzed by GPC for average molecular weight, $M_n$=2.4 kDa, $M_w$=11.5 kDa, PDI=4.74.

Neutralization of the polymer using $NH_4OH$ (2.87 g, 47.0 mmol), in $H_2O$ (58.3 g) followed by removal of the organic solvents under vacuum provided a cloudy yellow dispersion (24.1 wt. % solids, pH 7-8) in water. A calculated amount of this polymer dispersion (350 ppm of F) was added to samples exterior and interior test paints and the drawdown panels evaluated as per the test methods described.

Comparative Example 13A

By following a similar procedure as described in Example 10, semi-batch polymerization of 1H,1H,2H,2H-perfluorooctyl methacrylate (14.58 g, 33.8 mmol), 2-hydroxypropyl methacrylate (2.78 g, 19.3 mmol) and methacrylic acid, (2.67 g, 31.0 mmol), using VAZO-67 (0.395 g, 2.05 mmol) initiator, provided the polymer solution with >95% monomer conversion ($^1$H NMR). The polymer sample was analyzed by GPC for average molecular weight, $M_n$=18.9 kDa, $M_w$=26.2 kDa, PDI=1.38.

Neutralization of the polymer using $NH_4OH$ (2.87 g, 47.0 mmol), in $H_2O$ (58.3 g) followed by removal of the organic solvents under vacuum provided a cloudy yellow dispersion (24.0 wt. % solids, pH 7-8) in water. A calculated amount of this polymer dispersion (350 ppm of F) was added to samples of exterior and interior test paints and the drawdown panels evaluated as per the test methods described.

Example 14

By following a similar procedure as described in Example 10, semi-batch polymerization of 1H,1H,2H,2H-perfluorooctyl methacrylate (14.58 g, 33.8 mmol), ethyltriethyleneglycolemethacrylate (ETGMA) (4.75 g, 19.3 mmol) and methacrylic acid, (2.67 g, 31.0 mmol), using VAZO-67 (0.395 g, 2.05 mmol) initiator and 1-thioglycerol (0.840 g 7.76 mmol) chain transfer agent, provided the polymer solution with >95% monomer conversion ($^1$H NMR). The polymer sample was analyzed by GPC for average molecular weight, $M_n$=14.9 kDa, $M_w$=18.0 kDa, PDI=1.21.

Neutralization of the polymer using NH$_4$OH (2.87 g, 47.0 mmol), in H$_2$O (58.3 g) followed by removal of the organic solvents under vacuum provided a cloudy yellow dispersion (24.0 wt. % solids, pH 7-8) in water. A calculated amount of this polymer dispersion (350 ppm of F) was added to samples exterior and interior paints and the drawdown panels evaluated as per the test methods described.

Comparative Example 14A

By following a similar procedure as described in Example 10, semi-batch polymerization of 1H,1H,2H,2H-perfluorooctyl methacrylate (14.58 g, 33.8 mmol), ethyltriethyleneglycolemethacrylate (ETGMA) (4.75 g, 19.3 mmol) and methacrylic acid, (2.67 g, 31.0 mmol), using VAZO-67 (0.395 g, 2.05 mmol) initiator, provided the polymer solution with >95% monomer conversion ($^1$H NMR). The polymer sample was analyzed by GPC for average molecular weight, $M_n$=22.9 kDa, $M_w$=28.4 kDa, PDI=1.24.

Neutralization of the polymer using NH$_4$OH (2.87 g, 47.0 mmol), in H$_2$O (58.3 g) followed by removal of the organic solvents under vacuum provided a cloudy yellow dispersion (25.1 wt. % solids, pH 7-8) in water. A calculated amount of this polymer dispersion (350 ppm of F) was added to samples of exterior and interior test paints and the drawdown panels evaluated as per the test methods described.

Example 15

By following a similar procedure described in example 1, polymerization of 1H,1H,2H,2H-perfluorooctyl methacrylate, (6.80 g, 15.73 mmol), 2-(dimethylamino)ethyl methacrylate (1.85 g, 11.82 mmol), and methacrylic acid, (1.02 g, 11.85 mmol), in a solution of MIBK (3.75 g), IPA (11.25 g), 1-thioglycerol (0.40 g, 3.70 mmol), and VAZO-67 (0.20 g, 1.04 mmol) resulted in a yellow solution. The monomer conversion was >96% by $^1$H NMR. The polymer sample was analyzed by GPC for average molecular weight $M_n$=11.6/$M_w$=13.9, PDI=1.2.

A 3.0-g aliquot of the polymer solution was dispersed in water (4.8 g) by heating with 28 wt % aqueous ammonia solution until the mixture reached a pH of 7-8. Removal of the organic solvents under vacuum provided a 11 wt % dispersion of a cloudy polymer dispersion in water. A calculated amount of this polymer dispersion (350 ppm of F) was added to samples of exterior and interior test paints and the drawdown panels evaluated as per the test methods described.

Example 16

By following a similar procedure as described in Example 10, semi-batch polymerization of 1H,1H,2H,2H-perfluorooctyl acrylate (14.13 g, 33.8 mmol), 2-(diethylamino)ethyl acrylate (3.30 g, 19.3 mmol), and acrylic acid, (2.23 g, 31.0 mmol), using VAZO-67 (0.395 g, 2.05 mmol) initiator and 1-thioglycerol (0.840 g, 7.76 mmol) chain transfer agent, provided the polymer solution with >95% monomer conversion ($^1$H NMR). The polymer sample was analyzed by GPC for average molecular weight, $M_n$=7.7 kDa, $M_w$=10.5 kDa, PDI=1.4.

Neutralization of the polymer using NH$_4$OH (28% NH$_3$) (2.85 g, 47.0 mmol), in H$_2$O (58.3 g) followed by removal of the organic solvents under vacuum provided a cloudy yellow dispersion (20.8 wt. % solids, pH 7-8) in water. A calculated amount of this polymer dispersion (350 ppm of F) was added to samples of exterior and interior test paints and the drawdown panels evaluated as per the test methods described.

Comparative Example 16A

By following a similar procedure as described in Example 10, semi-batch polymerization of 1H,1H,2H,2H-perfluorooctyl acrylate (14.13 g, 33.8 mmol), 2-(diethylamino)ethyl acrylate (3.30 g, 19.3 mmol), and acrylic acid, (2.23 g, 31.0 mmol), using VAZO-67 (0.395 g, 2.05 mmol) initiator, provided the polymer solution with >95% monomer conversion ($^1$H NMR). The polymer sample was analyzed by GPC for average molecular weight, $M_n$=8.6 kDa, $M_w$=11.7 kDa, PDI=1.4.

Neutralization of the polymer using NH$_4$OH (28% NH$_3$) (2.85 g, 47.0 mmol), in H$_2$O (58.3 g) followed by removal of the organic solvents under vacuum provided a cloudy yellow dispersion (22.1 wt. % solids, pH 7-8) in water. A calculated amount of this polymer dispersion (350 ppm of F) was added to samples of exterior and interior test paints and the drawdown panels evaluated as per the test methods described.

Oil Repellency

Interior flat and exterior flat paint samples containing the fluorinated polymer compositions described in Examples 1 though 16, and paint samples containing the comparative polymer compositions made using either no chain transfer agent or using hydrophobic chain transfer agents were evaluated for oil repellency as described in Test Method 1. Paint samples containing fluorinated polymer additives showed better oil repellency compared to a control paint containing no additive (Table 1). Also, additives described in Example 1-16 showed better oil repellency performance compared to corresponding comparative samples (1A, 9A, 10A, 10B, 12A, 13A, 14A, and 16A).

TABLE 1

Oil Contact Angle Measurements

| Samples | Oil Contact Angle* in Exterior Flat Paint | Oil Contact Angle* in Interior Flat Paint |
|---|---|---|
| Control Paint | 0 | 0 |
| Example 1 | 51 | 70 |
| Example 2 | 48 | 71 |
| Example 3 | 54 | 73 |
| Example 4 | 60 | 44 |
| Example 5 | 62 | 44 |
| Example 6 | 57 | 48 |
| Example 7 | 52 | 63 |
| Example 8 | 62 | 71 |
| Example 9 | 51 | 65 |
| Example 10 | 32 | 48 |
| Example 11 | 57 | 52 |
| Example 12 | 46 | 67 |
| Example 13 | 45 | 36 |
| Example 14 | 45 | 71 |
| Example 15 | 54 | NA |
| Example 16 | 65 | 64 |

TABLE 1-continued

Oil Contact Angle Measurements

| Samples | Oil Contact Angle* in Exterior Flat Paint | Oil Contact Angle* in Interior Flat Paint |
|---|---|---|
| Comparative Example 1A | 10 | 22 |
| Comparative Example 9A | 41 | 58 |
| Comparative Example 10A | 40 | 39 |
| Comparative Example 10B | 33 | 48 |
| Comparative Example 12A | 30 | 43 |
| Comparative Example 13A | 0 | 41 |
| Comparative Example 14A | 28 | 44 |
| Comparative Example 16A | 63 | 50 |

*average of 3 measurements, higher values indicate better performance

Dirt Pick-Up Resistance

Exterior flat paint samples containing the fluorinated polymer compositions described in Examples 1 though 16, and paint samples containing the comparative polymer compositions made using either no chain transfer agent or using hydrophobic chain transfer agents were evaluated for dirt pick-up resistance (DPR) as described in Test Method 2. Paint samples containing fluorinated polymer additives showed very good dirt pickup resistance (lower value indicates better performance) compared to control paint where no additive was present (Table 2). Also, additives described in Example 1-16 showed better DPR performance compared to corresponding comparative samples (1A, 9A, 10A, 10B, 12A, 13A, 14A, and 16A).

TABLE 2

Dirt Pick-up Resistance (DPR)

| Samples | ΔL in Exterior Flat Paint* |
|---|---|
| Control Paint | 5.2 |
| Example 1 | 3.5 |
| Example 2 | 3.9 |
| Example 3 | 3.1 |
| Example 4 | 1.2 |
| Example 5 | 1.4 |
| Example 6 | 0.96 |
| Example 7 | 1.9 |
| Example 8 | 2.1 |
| Example 9 | 4.4 |
| Example 10 | 4.3 |
| Example 11 | 2.9 |
| Example 12 | 2.3 |
| Example 13 | 3.1 |
| Example 14 | 2.6 |
| Example 15 | 3.3 |
| Example 16 | 2.4 |
| Comparative Example 1A | 5.3 |
| Comparative Example 9A | 6 |
| Comparative Example 10A | 7.6 |
| Comparative Example 10B | 7.7 |
| Comparative Example 12A | 4.4 |
| Comparative Example 13A | 5.5 |
| Comparative Example 14A | 4.4 |
| Comparative Example 16A | 3.6 |

*lower value indicates better performance

Leneta Oil Stain Cleanability

Interior flat paint samples containing the fluorinated polymer compositions described in Examples 1 though 14, and paint samples containing the comparative polymer compositions made using either no chain transfer agent or using hydrophobic chain transfer agents, were evaluated for leneta oil stain clenability as described in the Test Method 3. Paint samples containing fluorinated polymer additives were significantly better than the control paint where no additive was present as represented by the difference in cleanability rating (Table 3). Additives described in Example 1-14 showed better cleanablity deltas compared to corresponding comparative samples (1A, 9-14A, and 10B).

TABLE 3

Leneta Oil Stain Cleanability and Comparison to Control

| Samples | Cleanability | ΔC* |
|---|---|---|
| Example 1 | 5.5 | 4.2 |
| Example 2 | 4.9 | 3.6 |
| Example 3 | 5.9 | 4.6 |
| Example 4 | 8.3 | 3.9 |
| Example 5 | 7.6 | 3.2 |
| Example 6 | 8.0 | 3.6 |
| Example 7 | 8.0 | 4.6 |
| Example 8 | 5.8 | 3.4 |
| Example 9 | 6.7 | 3.6 |
| Example 10 | 6.0 | 3.6 |
| Example 11 | 5.6 | 2.0 |
| Example 12 | 8.2 | 3.6 |
| Example 13 | 5.9 | 3.6 |
| Example 14 | 4.6 | 3.6 |
| Comparative Example 1A | 3.2 | 3.6 |
| Comparative Example 9A | 6.6 | 3.4 |
| Comparative Example 10A | 7.1 | 0.3 |
| Comparative Example 10B | 4.1 | 3.6 |
| Comparative Example 12A | 6.8 | 0.5 |
| Comparative Example 13A | 3.4 | 1.7 |
| Comparative Example 14A | 5.1 | −1.7 |

*higher value indicates better difference in cleanability

What is claimed is:

1. A coating composition comprising a coating base and an aqueous emulsion of formula (I)

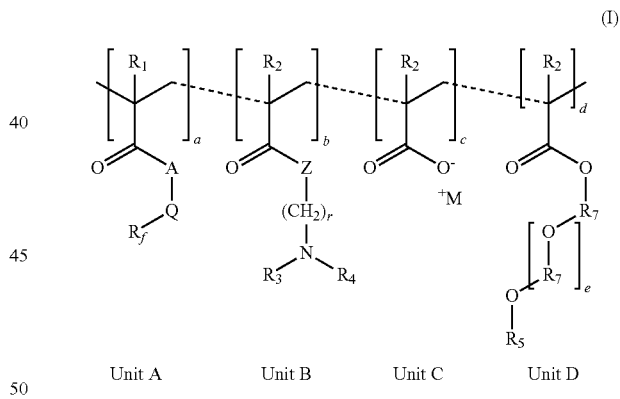

wherein
the composition of Formula (I) comprises a random copolymer;
$R_f$ is a straight or branched-chain perfluoroalkyl group of 2 to 6 carbon atoms, optionally interrupted by one or more —$CH_2$—, —CFH—, or combinations thereof;
A is O, S, or N(R'), wherein R' is H or an alkyl of from 1 to about 4 carbon atoms;
Q is a straight chain, branched chain or cyclic structures of alkylene, arylene, aralkylene, sulfonyl, sulfoxy, sulfonamido, carbonamido, carbonyloxy, urethanylene, ureylene, and combinations of such linking groups;
$R_1$ is H or $CH_3$,
$R_2$ is independently selected from H or an alkyl of 1 to about 4 carbon atoms;
r is independently 2 to 4;

Z is O or —NR'—, wherein R' is H or an alkyl of from 1 to about 4 carbon atoms;

$R_3$ and $R_4$ are each independently an alkyl of 1 to 4 carbon atoms, hydroxyethyl, benzyl, or $R_3$ and $R_4$ together with the nitrogen atom form a morpholine, pyrrolidine, or piperadine ring;

M is H, $HN(R_6)_3$, Na, Li, Cs, K, or mixtures thereof;

$R_6$ is H or an alkyl or hydroxyalkyl of 1 to 12 carbon atoms;

e is 0 to 40;

$R_5$ is H or an alkyl of 1 to 4 carbon atoms;

$R_7$ is a linear or branched alkylene of 2 to 4 carbon atoms;

a is 10 to 60 mol %;

b is 0 to 90 mol %;

c is 1 to 90 mol %; and d is 0 to 90 mol %;

wherein the sum of a+b+c+d is equal to 100%; and wherein said composition of formula (I) further comprises residue from a hydrophilic chain transfer agent of formula (II) $(Y—X—S)_g H_{2-g}$, wherein g is 1 or 2

X is a linear or branched alkylene of 1 to about 4 carbon atoms, optionally substituted with one or more hydrophilic functional groups selected from hydroxyl, carboxyl, or amine; and Y is a hydrophilic functional group selected from hydroxyl, carboxyl, thiol, or amine wherein the coating base is selected from the group consisting of an acrylic polymer, epoxy polymer, vinyl polymer, and polyurethane polymer in the form of an interior house paint, exterior house paint, stain, or clear coating; and wherein the coating composition comprises about 0.001% to 1% by weight of the compound of formula (I), on a dry weight basis of the compound of formula (I) to the weight of the wet coating composition.

2. The composition of claim 1, having a number average molecular weight $M_n$ of about 1500 to about 30,000 Daltons.

3. The composition of claim 1, wherein c is in the range of about 1 to about 60 mol %.

4. The composition of claim 1, wherein either b is at least 0.1 mol %; or d is at least 0.1 mol %.

5. The composition of claim 4, wherein b and d are each independently at least 0.1 mol %.

6. The composition of claim 1, comprising the residue of a chain transfer agent selected from the group consisting of thioglycerol, mercaptoethanol, thioglycolic acid, dithioerythritol, 2-mercaptopropionic acid, and 3-mercaptopropionic acid, or mixtures thereof.

7. The composition of claim 1, where the residue results from the use of a chain transfer agent in an amount of about 1 to about 25 mol %, based on the total amount of chain transfer agent and monomers used.

8. The composition of claim 7, where the residue results from the use of a chain transfer agent in an amount of about 3 to about 15 mol %, based on the total amount of chain transfer agent and monomers used.

9. The composition of claim 1, wherein Unit B results from the polymerization of a monomer selected from the group consisting of diethylaminoethyl acrylate, dimethylaminoethyl methacrylate, and mixtures thereof.

10. The composition of claim 1, wherein Unit D results from the polymerization of a monomer selected from the group consisting of ethyltriethyleneglycol (meth)acrylate, ethoxylated (meth)acrylates, poly(ethylene glycol) (meth)acrylates, poly(ethylene glycol) methyl ether (meth)acrylates, propoxylated (meth)acrylates, poly(propylene glycol) (meth)acrylates, and poly(propylene glycol) methyl ether (meth)acrylates, and mixtures thereof.

11. A method of imparting cleanability to a coating composition comprising contacting a coating base with a polymer composition comprising formula (I)

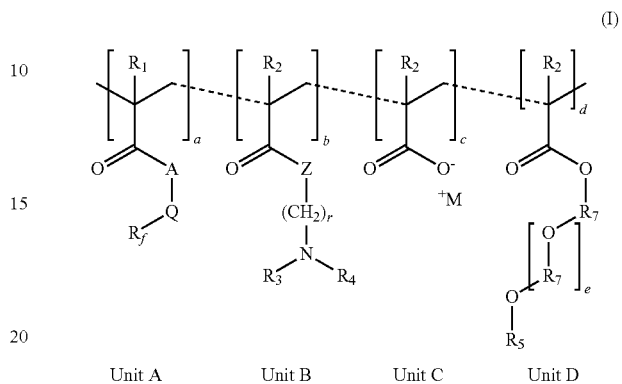

wherein the composition of Formula (I) is a random copolymer;

$R_f$ is a straight or branched-chain perfluoroalkyl group of 2 to 6 carbon atoms, optionally interrupted by one or more —$CH_2$—, —CFH—, or combinations thereof;

A is O, S, or N(R'), wherein R' is H or an alkyl of from 1 to about 4 carbon atoms;

Q is a straight chain, branched chain or cyclic structures of alkylene, arylene, aralkylene, sulfonyl, sulfoxy, sulfonamido, carbonamido, carbonyloxy, urethanylene, ureylene, and combinations of such linking groups;

$R_1$ is H or $CH_3$, $R_2$ is independently selected from H or an alkyl of 1 to about 4 carbon atoms;

r is independently 2 to 4;

Z is O or —NR'—, wherein R' is H or an alkyl of from 1 to about 4 carbon atoms;

$R_3$ and $R_4$ are each independently an alkyl of 1 to 4 carbon atoms, hydroxyethyl, benzyl, or $R_3$ and $R_4$ together with the nitrogen atom form a morpholine, pyrrolidine, or piperadine ring;

M is H, $HN(R_6)_3$, Na, Li, Cs, K, or mixtures thereof;

$R_6$ is H or an alkyl or hydroxyalkyl of 1 to 12 carbon atoms;

e is 0 to 40;

$R_5$ is H or an alkyl of 1 to 4 carbon atoms;

$R_7$ is a linear or branched alkylene of 2 to 4 carbon atoms;

a is 10 to 60 mol %;

b is 0 to 90 mol %;

c is 1 to 90 mol %; and d is 0 to 90 mol %;

wherein the sum of a+b+c+d is equal to 100%; and wherein said composition of formula (I) further comprises residue from a hydrophilic chain transfer agent of formula (II) $(Y—X—S)_g H_{2-g}$, wherein g is 1 or 2

X is a linear or branched alkylene of 1 to about 4 carbon atoms, optionally substituted with one or more hydrophilic functional groups selected from hydroxyl, carboxyl, or amine; and Y is a hydrophilic functional group selected from hydroxyl, carboxyl, thiol, or amine, wherein the coating base is selected from the group consisting of an acrylic polymer, epoxy polymer, vinyl polymer, and polyurethane polymer in the form of an interior house paint, exterior house paint, stain, or clear coating; and wherein the coating composition comprises about 0.001% to 1% by weight of the polymer composition of formula (I), on a dry weight basis of the polymer composition of formula (I) to the weight of the wet coating composition.

12. The method of claim 11, wherein the polymer composition has a number average molecular weight $M_n$ of about 1500 to about 30,000 Daltons.

13. The method of claim 11, wherein either
b is at least 0.1 mol %; or
d is at least 0.1 mol %.

14. The method of claim 13, wherein of b and d are each independently at least 0.1 mol %.

15. The method of claim 11, wherein c is in the range of 1 to about 60 mol %.

16. The method of claim 11, wherein the polymer composition provides an oil stain cleanability score ΔC of at least 2.0 and a dirt pickup resistance of at most 4.0 when added to a paint coating.

17. The method of claim 11, wherein the polymer composition comprises the residue of a chain transfer agent selected from the group consisting of thioglycerol, mercaptoethanol, thioglycolic acid, dithioerythritol, 2-mercaptopropionic acid, and 3-mercaptopropionic acid, or mixtures thereof.

18. The composition of claim 11, where the residue results from the use of a chain transfer agent in an amount of about 1 to about 25 mol %, based on the total amount of chain transfer agent and monomers used.

19. The composition of claim 11, where the residue results from the use of a chain transfer agent in an amount of about 3 to about 15 mol %, based on the total amount of chain transfer agent and monomers used.

20. The method of claim 11, wherein Unit B results from the polymerization of a monomer selected from the group consisting of diethylaminoethyl acrylate, dimethylaminoethyl methacrylate, and mixtures thereof.

21. The method of claim 11, wherein Unit D results from the polymerization of a monomer selected from the group consisting of ethyltriethyleneglycol (meth)acrylate, ethoxylated (meth)acrylates, poly(ethylene glycol) (meth)acrylates, poly(ethylene glycol) methyl ether (meth)acrylates, propoxylated (meth)acrylates, poly(propylene glycol) (meth)acrylates, and poly(propylene glycol) methyl ether (meth)acrylates, and mixtures thereof.

22. The coating composition of claim 1, wherein the coating base is an aqueous acrylic latex paint.

\* \* \* \* \*